United States Patent [19]
Takizawa et al.

[11] Patent Number: 5,739,596
[45] Date of Patent: Apr. 14, 1998

[54] POWER SUPPLY FOR AN ELECTRONIC DEVICE AND POWER DELIVERY METHOD THEREFOR

[75] Inventors: Yasutoshi Takizawa; Katsunori Nagao; Shigeo Ikeda, all of Suwa, Japan

[73] Assignee: Seiko Epson Corporation, Tokyo, Japan

[21] Appl. No.: 630,956

[22] Filed: Apr. 5, 1996

[30] Foreign Application Priority Data

Apr. 6, 1995 [JP] Japan .................. 7-081416

[51] Int. Cl.$^6$ ............................................. H02J 7/00
[52] U.S. Cl. .................. 307/66; 307/64; 307/65; 320/7; 320/43; 364/273; 364/492
[58] Field of Search ................. 307/66, 65, 64, 307/85, 139, 44, 48; 320/2, 7, 30, 43; 364/492, 273–273.5

[56] References Cited

U.S. PATENT DOCUMENTS

| | | | |
|---|---|---|---|
| 3,666,962 | 5/1972 | Bogue et al. | 307/65 |
| 3,757,795 | 9/1973 | Anderson | 128/419 P |
| 4,143,283 | 3/1979 | Graf et al. | 307/66 |
| 4,281,278 | 7/1981 | Bilsky et al. | 320/13 |
| 4,315,162 | 2/1982 | Ferguson | 307/66 |
| 5,270,946 | 12/1993 | Shibasaki et al. | 364/492 |
| 5,300,874 | 4/1994 | Shimamato et al. | |
| 5,422,558 | 6/1995 | Stewart | 320/7 |

FOREIGN PATENT DOCUMENTS

| | | |
|---|---|---|
| 1-147639 | 10/1989 | Japan . |
| 3-116312 | 5/1991 | Japan . |
| 4-155422 | 5/1992 | Japan . |
| 5-211728 | 8/1993 | Japan . |
| 6-327163 | 11/1994 | Japan . |
| 624 944 A | 11/1994 | Japan . |

*Primary Examiner*—William M. Shoop, Jr.
*Assistant Examiner*—Albert W. Paladini

[57] ABSTRACT

An electronic apparatus comprises a main circuit having a main CPU and a power supply system which includes plural main batteries for supplying operating power to said main circuit, a back-up battery, a switching circuit connected between each main battery and the main circuit, power means for enabling the operation of the main circuit, a charge detector for detecting the charging level of each main battery, and power controller responsive to the power means and the charge detector and having a sub-CPU for individually controlling the switching circuit according to either a single connection mode or a multiple connection mode. In the single connection mode only one of the main batteries is connected to said main circuit. In the multiple connection mode, at least two main batteries, each in series with a respective diode means, are connected in parallel to the main circuit. The back-up battery is connected to supply power to the power controller only when either no main battery is installed or the charging level of each of the installed main batteries is below a predetermined value required for back-up operation.

17 Claims, 8 Drawing Sheets

POWER SUPPLY FOR AN ELECTRONIC DEVICE AND POWER DELIVERY METHOD THEREFOR

BACKGROUND OF THE INVENTION

1. Field of the Invention

The present invention relates generally to battery-powered devices and is particularly concerned with power controllers and associated techniques for managing and regulating multi-battery power sources.

2. Description of the Related Art

Japanese Kokai JP-A-3116312/1991 discloses a portable computer having two main, independently detachable batteries. When the computer is switched on, the computer checks whether one of the two batteries that had been used as a power supply before the current power cycle is currently attached to the system. If so, the computer checks whether this battery's charging level is above a predetermined threshold. If these two conditions are fulfilled, operating power will be supplied from this battery.

However, if either of the aforementioned battery status conditions is not met, the computer instead attempts to query the status of the second battery and checks whether both these conditions are fulfilled as applied to the second battery. If so, the second battery is used to supply the device with power. If neither battery fulfills these conditions, the computer alerts the user.

In this conventional device, since the attachment status and charge state of the main batteries are unknown when the computer is switched on, the checking of the status may have to performed using power provided from a back-up battery. This requires a higher capacity back-up battery than is required for normal back-up purposes and may result in a more frequent replacement of the back-up battery.

Also, Japanese Kokai JP-A-4155422 discloses a personal computer having two batteries independently selectable as a power source including an indicator displaying to the user which of the batteries is in use. Further, a separate voltage measuring device is connected to each battery for measuring the charging level of the batteries, and a controller for selecting the battery having the lower charging level to become the main power source and the other battery as the backup supply.

OBJECTS OF THE INVENTION

An object of the present invention is to obviate the problems of the prior art explained above and to provide a battery driven electronic apparatus having plural main batteries, a back-up battery and a power control system wherein the main batteries are used wherever possible to relieve the back-up battery. A further object of the invention is to provide a method of controlling the power supply in such apparatus so as to make effective use of the main battery power and avoid misoperations due to an unexpected discharge.

SUMMARY OF THE INVENTION

In accordance with these and related objects, the power supply of the present invention comprises: 1) plural power sources, each potentially capable of powering an electronic device; 2) a charge level detector to independently detect the charge levels of each power source connected to the supply; 3) a switching circuit to selectively deliver power from one or more of the connected power sources, preferably according to either single or multiple connection switching modes; and 4) a power controller which ascertains which switching mode to utilize based on information collected by the charge level detector.

The power supply according to the present invention preferably functions as follows. First, all the power sources are switched into a multiple connection mode in which parallel connections are maintained to the power input port of the electronic device while the power sources are diode-isolated from potentially damaging reverse current flow. Next, the power controller utilizes the charge detector to select one of the power supplies whose charge level exceeds a predetermined or user-selectable threshold. The power source exhibiting the highest relative charge level above this threshold is typically selected.

Once a suitable power supply has been selected by passing the above criteria, the power controller informs the switching circuit to switch in the selected power source to power the electronic device preferably according to a single connection mode, in which a series connection is made between the selected power source and the power input port of the electronic device while the remaining non-selected power sources are disconnected. It should be noted here, that in the preferred switching circuit, the non-selected power sources remain diode-isolated from reverse current flow by either external diode circuits or parasitic diodes inherently present in the individual switching elements (e.g. FET transistors).

In addition, the power controller according to the present invention monitors the selected power source and attempts to find alternate power source when this selected power source falls below a second predetermined threshold which is typically less than the prior threshold described hereinabove. More particularly, such monitoring may be accomplished by momentarily switching out the selected power source and relying on an alternate power source or designated backup battery to temporarily power the device. Then, the selected device's charge level can be accurately tested in an unloaded situation. Once measurements are complete, the selected, tested power source can be switched back in.

If the selected power source fails any of these periodic charge level tests, a suitable alternative source or backup can be switched in to continue supplying power to the device. The alternative source could again include the power source having the highest remaining charge level to maximize operational life of the electronic device. However, if no suitable alternative source can be found, the power controller can instruct the switching circuit to revert back to the protective multiple connection mode and even force the electronic device into an orderly shut-down or suspension of operations.

In order to accomplish the above-mentioned switching activities, the presently preferred switching circuit includes two independently addressable switching elements for each power source serving as a potential main source of power for the electronic device. As noted above, these switching elements may include diode components to prevent reverse current flow back into both the selected and all nonselected power sources. Ideally, the switching elements constitute FET transistors whose gate electrodes are selectively biased into saturation by the power controller to create a low-loss transmission gate having high current carrying capacity. Moreover, because of the inherent parasitic diode effects present in such transistors, connecting the FET pairs in a manner in which the respective "anodes" or "cathodes" of their parasitic diodes are electrically connected can adequately isolate the power supplies without additional diodes being added. Of course, external Schottky barrier diodes may be applied across the switching element transmission terminals to enhance reverse current isolation, regardless which type of electronic switch is used.

Also, preferably, lithium-ion class batteries are used for the main power sources, due to their relatively long-life and stable discharge characteristics. Moreover, lithium-ion batteries enjoy charge levels which are consistent with their output voltage, so measurement and detection of charge levels, as well as charge level comparison and logic, may be accurately implemented according to the present invention. Note, however, that other power source technologies may be implemented will be discussed hereinbelow, including, but not limited to, rechargeable alkaline, nickel-cadmium and nickel metal hydride batteries.

Other objects and attainments together with a fuller understanding of the invention will become apparent and appreciated by referring to the following description and claims taken in conjunction with the accompanying drawings.

BRIEF DESCRIPTION OF THE DRAWINGS

The presently preferred and alternative embodiments of the present invention and the effects and advantages achieved by individual aspects of the invention are described hereinbelow with reference to the accompanying figures, in which.

DESCRIPTION OF THE PREFERRED AND ALTERNATIVE EMBODIMENTS

Details of the presently preferred and alternative embodiments of the invention will be described below with reference to a hand-held or a laptop computer. It will be understood that such computer is only one example of an electronic apparatus and that the invention is applicable to other types of battery driven electronic apparatus such as mobile communication apparatus, printers and measurement appliances to mention a few only.

Figure 1:
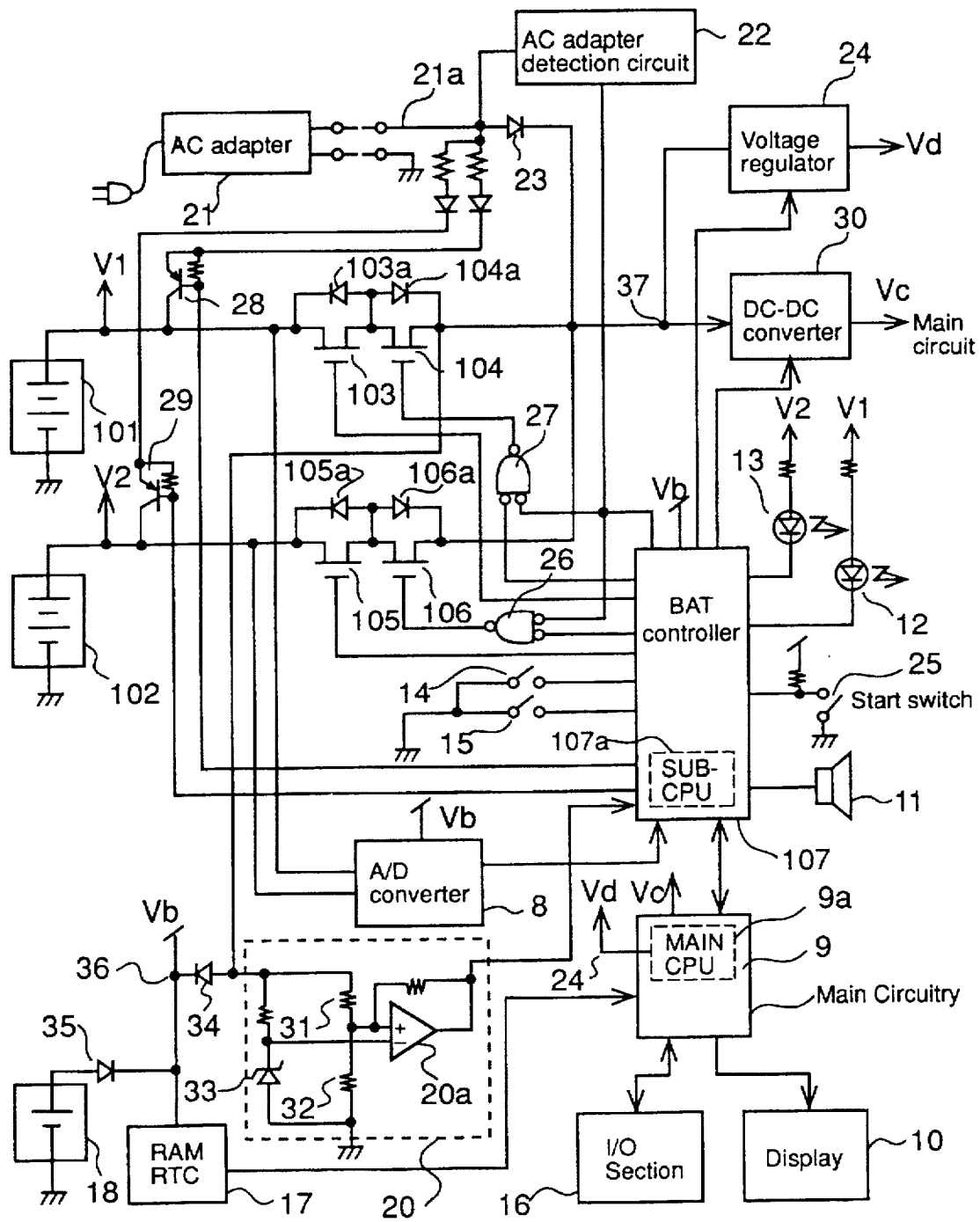
FIG. 1 is a circuit diagram of a computer incorporating the preferred embodiment of the present invention.

FIG. 1 is a basic circuit diagram of a hand-held or a laptop computer embodying the preferred embodiment of the present invention.

As shown in FIG. 1, the computer has a main circuit 9 including a main CPU 9a and peripheral circuits, and I/O section 16, a display 10, a RAM/RTC (random access memory and real-time clock) 17 connected thereto. Also, and a power supply system for supplying power to these circuits are shown connected to the main circuit 9. The power supply system comprises mainly: two batteries or battery packs 101 and 102 as the main power supply; a back-up battery 18 as a back-up power supply; a battery controller 107 forming the power controller; an A/D converter 8 employed as voltage detector; and a voltage comparator 20. The battery controller 107 includes a sub-CPU 107a that monitors the power supply voltage even when the main circuit 9 is not active, such as in a resume mode or a suspend mode which will be explained later herein below.

As further shown in FIG. 1, both battery packs 101 and 102 are connected via respective field effect transistors (FETs) 103 to 106 and diodes 103a through 106a (which will be explained later) to the input of the DC—DC converter 30. As shown in FIG. 1, an AC adapter 21 is provided in addition to battery packs 101 and 102 as a potential main power supply from which power can be supplied to the input of the DC—DC converter 30 via input terminal 21a and diode 23.

As shown in FIG. 1, the input of the DC—DC converter 30 is connected via a diode 34 to a node 36. The back-up battery 18 is connected via a diode 18 to the node 36. Diodes 34 and 35 are arranged in an anti-series connection so as to "isolate" back-up battery 18 from DC—DC converter 30. From node 36 a supply voltage Vb (control/back-up power) is applied to RAM/RTC 17, battery controller 107. In this embodiment, the node 37 between 34 and the input of DC—DC converter 30 is also connected to a voltage regulator 24 for applying a voltage Vd to main CPU 9a of the main circuit 9. Voltage regulator 24 is controlled by battery controller 107. A supply voltage Vc is applied from the output of DC—DC converter 30 to the circuits other than those of the power supply system. Incidentally, as will be understood by those skilled in the art, Vc may represent a plurality of different supply voltages generated by DC—DC converter 30 in accordance with the respective requirements of the electronic apparatus to which the invention is applied. The operation of DC—DC converter 30 is controlled by battery controller 107 so as to disable the DC—DC converter if neither of battery packs 1 and 2 are able to supply the power required for normal computer operation (the operating power) and AC adapter 21 is not connected. In the following description it is assumed that the AC adapter 21 is not connected.

When a power switch 25 is turned on operating power is supplied to main circuit 9 from battery pack 101 or battery pack 102 via DC—DC converter 30. In the following text, a battery pack currently used to supply power will be referred to as "selected" battery pack while a battery pack currently not used will be referred to as "non-selected" battery pack. Voltage comparator 20 automatically monitors the voltage of the selected battery pack, i.e., the voltage at the input of DC—DC converter 30. When this voltage drops below a predetermined detection threshold, voltage comparator 20 outputs a signal to battery controller 107 causing the battery controller to enter a suspend mode. In this suspend mode all FETs 103 through 106 are switched off and the battery controller and the RAM/RTC 17 are powered by back-up battery 18. Thus, the content of RAM/RTC 17 can be retained during this suspend mode even if both battery packs 1 and 2 are removed. When the computer stops operating, as by turning off the power switch, the operating power supply is interrupted, and current consumption is significantly lower than in the case of the normal operating state.

Figure 2:
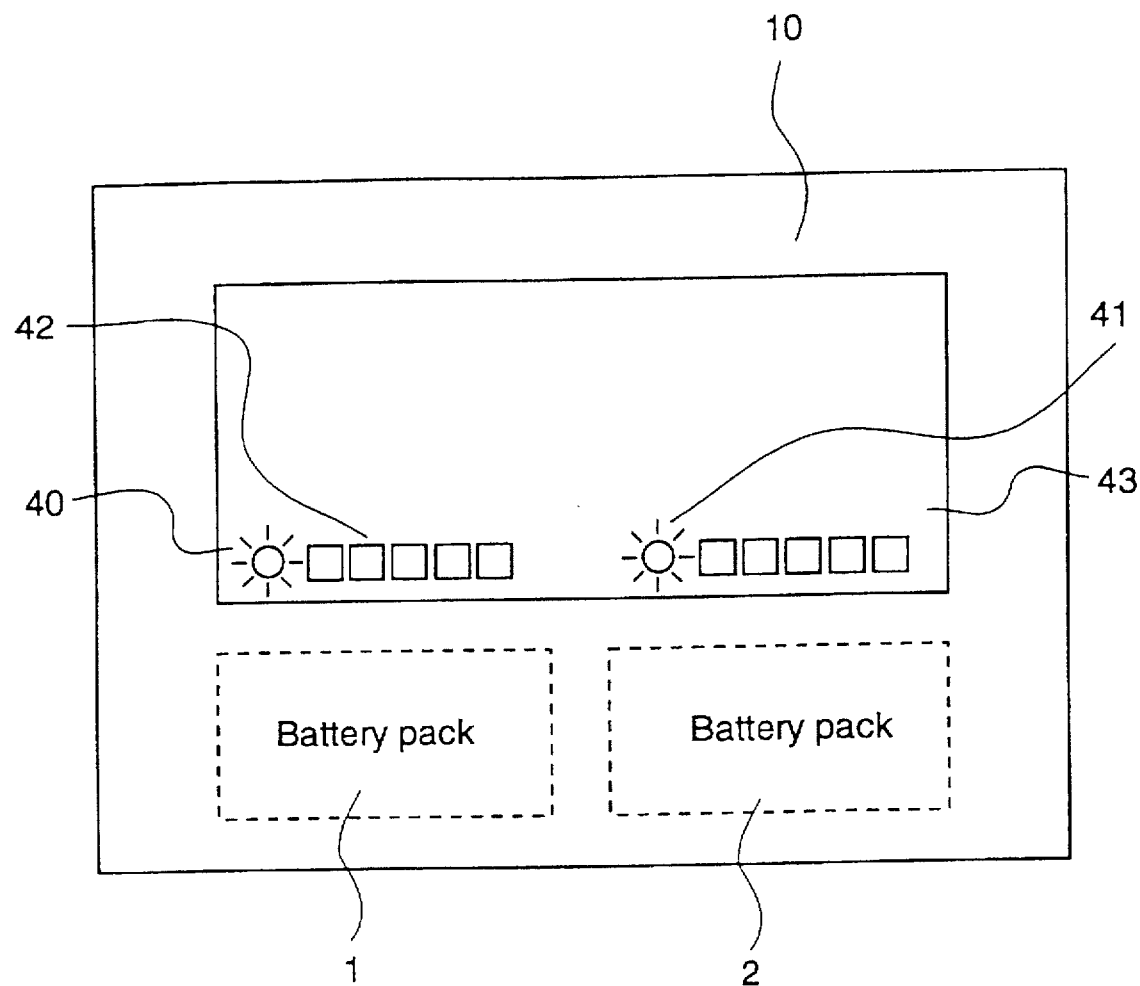
FIG. 2 shows an example computer display of the computer of FIG. 1.

FIG. 2 is a schematic front view of the computer mainly showing the display 10 which may preferably comprise an LCD panel. Display 10 includes a display section for displaying status information related to the battery packs. There are two types of information displayed on display 10. The first is which of the two battery packs is selected; the second is the current charging level or the voltage of each battery pack. Indicators 40 and 41 display the current operating status, i.e., whether the associated battery pack is selected or not. Indicators 42 and 43 display the charging level or the voltage of the corresponding battery pack. As shown in FIG. 2, the preferred method of displaying this information is to maintain an obvious relationship between the physical location of the battery packs 101, 102 (shown in phantom lines) and the position of the associated operating status indicators 40, 41 so that the user can readily determine to which battery pack the indicators refer.

As shown in FIG. 2, each status indicator 40, 41 may be a symbol (symbolizing the sun for instance) which is displayed or not displayed depending on the selection status of the respective battery pack. The battery charging level or the voltage may be displayed using a five-stage bar graph for voltage indicators 42 and 43. Note that while the status and condition of each battery pack is displayed on the LCD display 10 in this embodiment, LEDs or other devices may be alternatively used. Note, also, that the status indicators are displayed in a horizontal orientation in FIG. 2 because this matches the side by side, horizontal arrangement of the battery packs. If the batteries are arrayed differently, e.g., in a vertical or a stacked arrangement, the status indicators can be made easier for the user to read by matching the arrangement of the indicators to the physical arrangement of the batteries.

Figure 4:
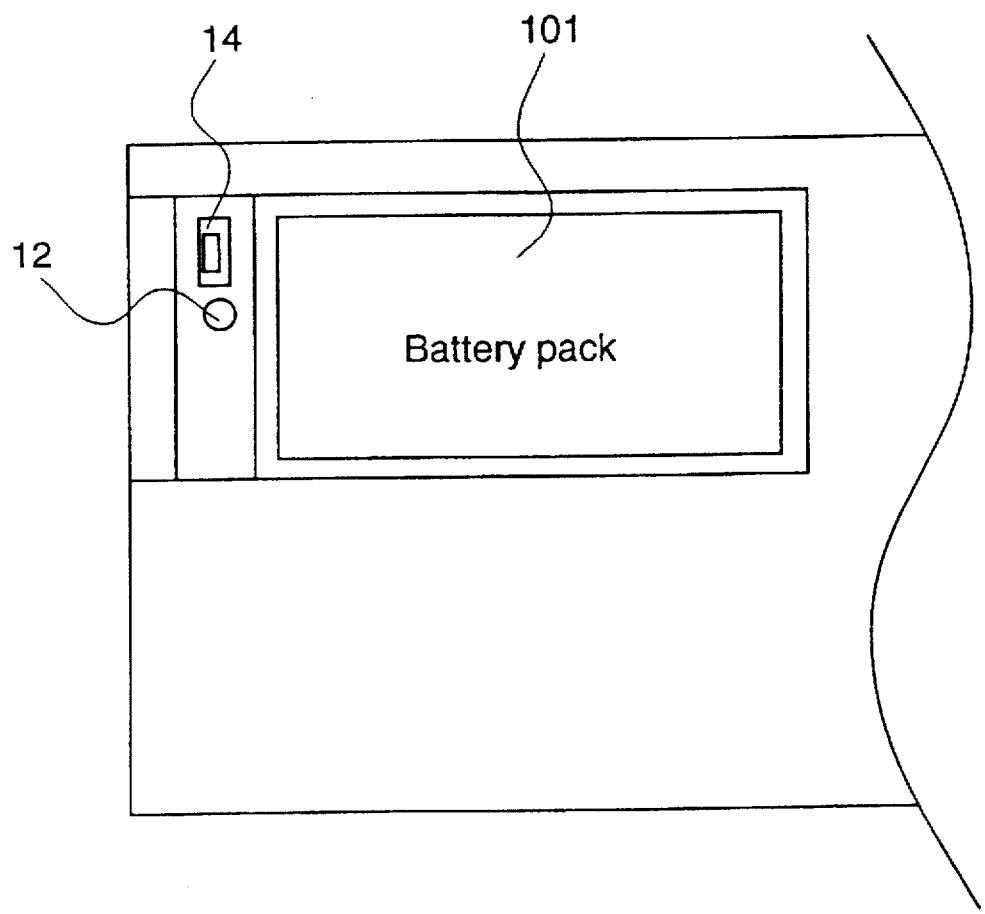
FIG. 4 shows a battery compartment of the computer of FIGS. 1-3C with the battery cover removed.
Figures 3A, 3B, 3C:
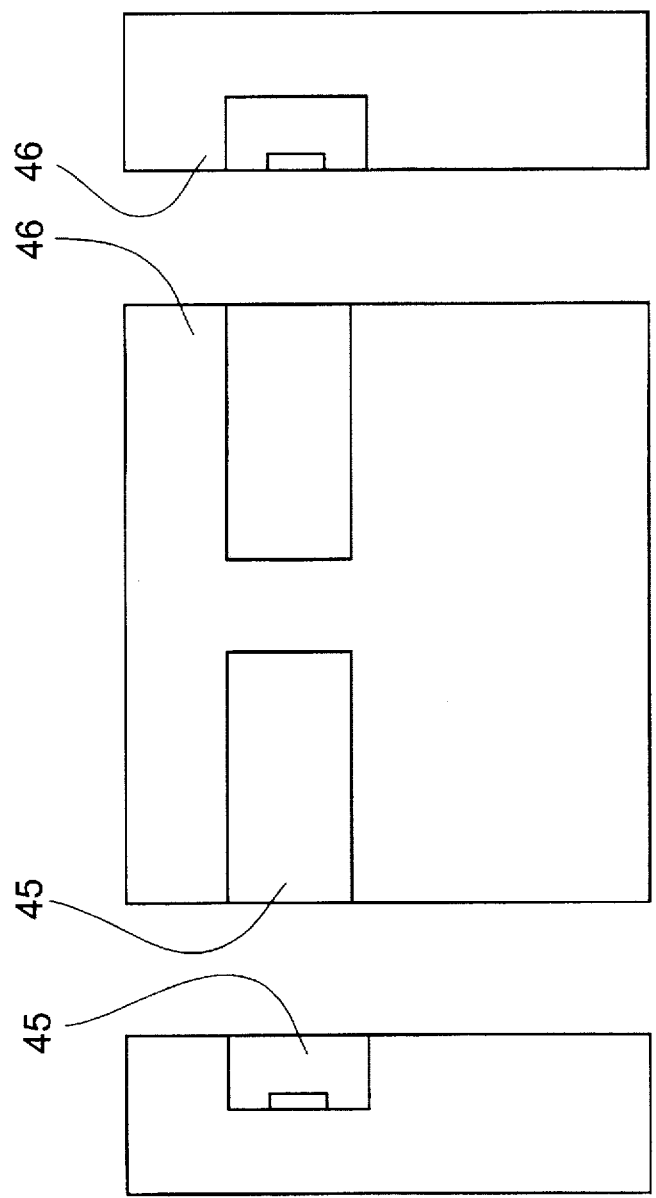
FIGS. 3A-3C show respective side and rear external casing views of the computer of FIGS. 1 and 2.

FIGS. 3A and 3C illustrate are schematic side views of the computer case according to the preferred embodiment. FIG. 3B illustrates a back view of this computer case. As shown herein, Battery pack 101 and battery pack 102 are housed in battery compartments provided in the bottom of the computer's case, each battery compartment having a respective battery cover 45, 46, which can be opened to allow replacement of the battery packs. FIG. 4 shows the structure of the battery compartment for battery pack 101, as viewed with the battery cover opened (since the structure of the two battery compartments is the same, only one need be described herein). Battery pack 101, an LED 12, and a cover detection switch 14 as a cover-open sensor for the battery compartment accommodating battery pack 101 are exposed by opening battery cover 45. The cover detection switch 14 forms the battery load/unload detector means for detecting whether a battery pack is being installed or removed, and preferably operates by detecting whether the battery cover is open or closed. When battery cover 45 is opened, cover detection switch 14 operates. Likewise, opening the battery cover 46 of the battery compartment for battery pack 102 exposes an LED 13 and a cover detection switch 15 (shown in FIG. 1) and causes cover detection switch 15 to operate.

Returning to FIG. 1, FETs 103, 104, 105 and 106 are used as switching elements for turning the power supply from any battery pack on or off, i.e. for connecting or disconnecting a battery pack to the input of DC—DC converter 30. Parallel to the FETs are diodes 103a, 104a, 105a, and 106a, which could comprise parasitic diodes internal to the FETs. Note, however, that the diodes 104a and 106a provided in parallel to FETs 104 and 106 may, as necessary, be external diodes with a low forward voltage and high current capacity such as Schottky barrier diodes as will be explained later. FETs 103 and 104 are serially connected between one output terminal of battery pack 101 herein below and the input of DC—DC converter 30, and FETs 105 and 106 are similarly serially connected between one output terminal of battery pack 102 and the input of DC—DC converter 30. The second terminal of each battery pack is grounded in this embodiment. The gate terminals of these four FETs are separately connected to the battery controller 7, enabling each FET to be independently turned on or off by the battery controller 7. Note, that bipolar transistors, relays, or other devices may be used in place of these FETs, as will become evident to those ordinarily skilled in the art.

Because a parasitic diode is normally contained in a FET, current continues to flow through the parasitic diode from the anode to the cathode even when the FET is turned off. To avoid such current through the parasitic diode when a FET is used as a switching element, it is known in the art to connect two FETs in series in such a way that the anodes or cathodes of their parasitic diodes are connected together (anti-series connection) to achieve a full switching capability. In such manner, however, the two serially connected FETs are always controlled to the same state either both on or both off. In an power control system according to the present invention, however, these FETs (or other switching elements) can be turned on and off independently. Therefore, when FET 103 or 105 is on and FET 104 or 106 is off, power is supplied from FET 103 or 105 through diode 104a or 106a; if both FET 103 and FET 105 are off, the battery power supply is turned off completely. It is therefore possible to supply power flexibly in various power supply modes.

The on/off operation of the FETs is controlled with the following on/off combinations. To select battery pack 101, i.e., to supply power from battery pack 1, FET 103 and FET 104 are on and FET 105 and FET 106 are off. To select battery pack 102, i.e., to supply power from battery pack 102, FET 103 and FET 104 are off and FET 105 and FET 106 are on. Each of these two modes will be referred to as "single connection mode". To supply power from both battery pack 101 and battery pack 102 by means of a diode OR connection, FET 103 and FET 105 are on and FET 104 and FET 106 are off. This mode will be referred to as "multiple connection mode". When the battery packs 101 and 102 are OR'd in this way by the diodes parallel to FETs 104 and 106, power is supplied by means of these diodes from the battery pack with the higher voltage level. For example, if the voltage of battery pack 101 is greater than the voltage of battery pack 102, the diode parallel to FET 104 turns, and a reverse bias is applied to the diode parallel to FET 106, turning this diode off. In this state, only battery pack 101 discharges while battery pack 102 does not discharge; the voltage level of battery pack 101 therefore gradually drops until the voltage level of battery pack 1 equals that of battery pack 102. The diode parallel to FET 104 and the diode parallel to FET 106 then turn simultaneously on, and power is supplied from both battery packs. Note that the diodes prevent current from flowing from the battery pack with the higher voltage to the battery pack with the lower voltage. It is thus possible to achieve these three control states by independently controlling the operation of these four FETs. Incidentally, it will be understood that diodes 34 and 35 provide a similar "multiple connection mode" for the back-up power, i.e. back-up power is supplied from either the battery pack(s) or the back-up battery 18 which ever has the higher voltage.

The operation of the present embodiment of the invention is described in detail below.

When power switch 25 is turned on in order to supply operating power to the main circuit 9, the battery controller initially sets the multiple connection mode by turning FETs 103, 105 and FETs 104, 106 off. The reason why the multiple connection mode is initially used for the following reasons.

Before the power switch 25 is pressed, the battery controller may be in the suspend mode mentioned above. This will be the case, for instance, when the battery packs 101, 102 are completely discharged or detached from the computer housing. When the power switch is pressed the battery controller is released from its suspend mode. However, in order not to consume too much power from the back-up battery 18, the battery controller will immediately fall back to the suspend mode unless there is power supply from any of the battery packs sufficient to maintain the controller's normal operation mode (e.g. Vb is higher than the detection threshold of voltage comparator 20). However, even if one or both battery packs have already been re-inserted when the power switch is pressed, the battery controller, initially, does not know which battery pack is present and, if both are present, which is suitable for the power supply. Therefore, in this initial stage, the multiple connection mode provides the best chance for the battery controller to receive the power from a battery pack required to bring it into its normal operation mode. The battery controller can then perform the following steps to determine which battery pack should be used following the initial stage.

Figure 5:
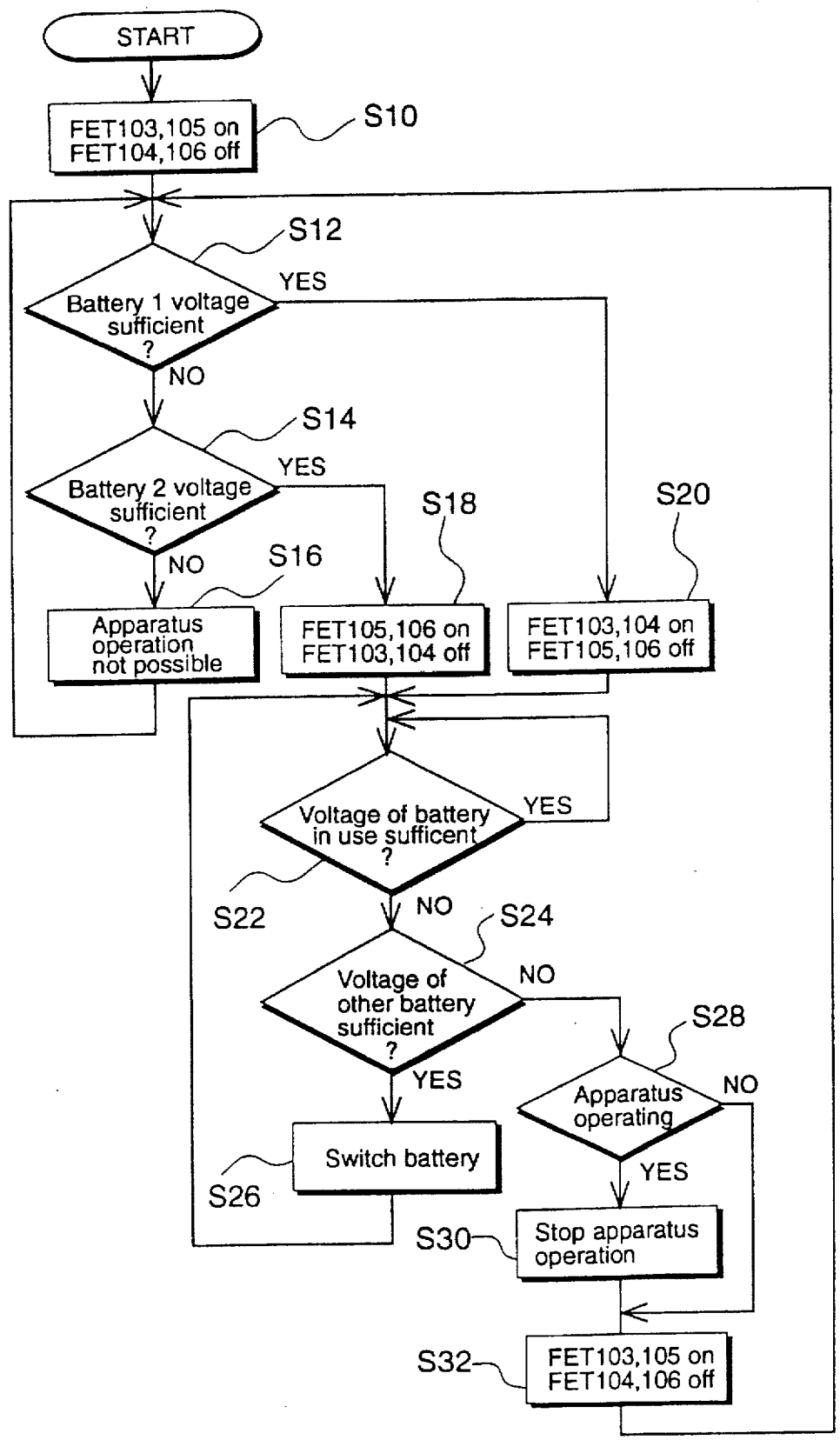
FIG. 5 is a flow chart used to describe the power supply control process during normal operation according to the preferred embodiment of the invention.

Referring now to the flow chart in FIG. 5, when at the time of pressing the power switch, assuming at least one battery pack is loaded and sufficiently charged, battery controller 107 is initialized, thus turning FETs 103 and 105 on and FETs 104 and 106 off as shown in step S10 to set the power supply into multiple connection mode. Battery controller 107 then measures the voltage of battery pack 101 using A/D converter 108 in step S12. If the voltage level of battery pack 101 is sufficient, i.e. above a reference level Vref10, FETs 103 and 104 are turned on and FETs 105 and 106 off as shown in step S20, thereby changing to the single connection mode with battery pack 101 being selected and battery pack 102 non-selected.

However, if in step S12 the voltage level of battery pack 101 is determined to be insufficient (below the threshold Vref10), the voltage level of battery pack 102 is measured in step S14. If the voltage level of battery pack 102 is sufficient, i.e. above a reference level Vref20, FETs 103 and 104 are turned off and FETs 105 and 106 are turned on as shown in step S18 to select battery pack 102 while battery pack 101 becomes non-selected. If neither battery pack is sufficiently charged, the multiple connection mode as set in step S10 is retained, no operating power is supplied to the main circuit and the computer is, thus, prevented from operating. In this case, the control procedure loops through steps S12, S14 and S16 constantly monitoring the battery voltages. If at some point of time, a charged battery pack is inserted, this will be detected in either step S12 or S14, as appropriate. The computer becomes operable when operating power is supplied from a battery pack at either step S20 or S18. The voltage of the selected battery pack is then measured at step S22.

As mentioned above, if both battery packs 101, 102 are installed and both battery covers 45, 46 are closed but one of the battery packs is not sufficiently charged, the charged battery pack is selected and power is supplied from this battery pack. Different from the process described above, the battery controller 107 may compare the voltage levels of the two battery packs and select the one having the higher voltage level. When the non-selected battery is already discharged, the battery controller sends such information to the main circuit so that this fact may be displayed and/or acoustic alarm given.

Next, an operation of exchanging the battery packs is described below.

Assume two charged battery packs are installed and FETs 103 and 104 are on while FETs 105 and 106 are off, i.e., battery pack 101 becomes the selected one. During operation, the battery controller periodically checks the voltage levels of the battery packs, the conditions thereof such as loaded or unloaded or the opening/closing of the battery covers. The main circuitry 109 receives the operating status (selected or non-selected) and battery voltage of the battery packs from battery controller 107, and displays the operating status and voltage on display 10 upon request from the user or corresponding to a preinstalled program operating on the computer.

Figure 7:
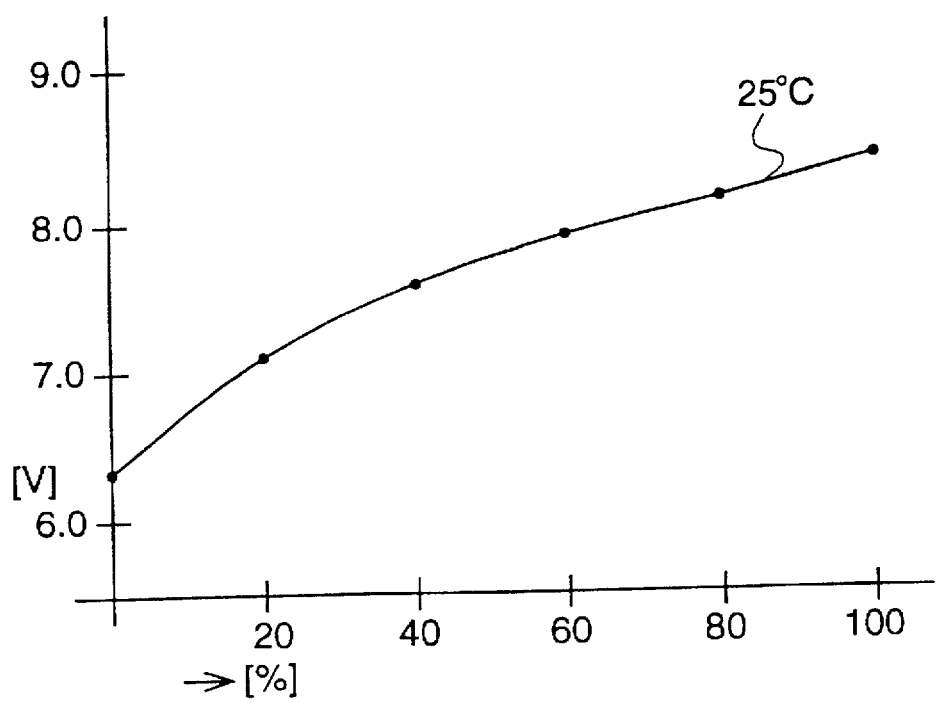
FIG. 7 diagrammatically shows the relationship between the open terminal voltage and the charging level of a lithium ion battery used in conjunction with the preferred embodiment of the present invention.

Since, in the assumed example, battery pack 101 is first selected and supplies power to the circuit, its voltage gradually drops. FIG. 7 shows, for example, the relationship between the open terminal voltage of a two-cell lithium ion battery pack and the charging level. In FIG. 7 the ordinate represents the voltage and the abscissa the charging level in %. As to be taken from FIG. 7 the relationship between the terminal voltage and the charging level is nearly proportional and the terminal voltage can be used as a magnitude representing the remaining charge of a lithium ion battery.

The voltages are preferably measured in an open terminal, i.e. off-load, condition. If measurement is performed in on-load condition, the load current causes a voltage drop across the internal resistance of a battery, so the measurement result will differ from that in off-load condition. It is well known that, different from Ni—Cd batteries, the voltage of lithium ion batteries is hardly influenced by temperature variations so that the measured voltage need not be corrected in accordance with the environmental temperature. As a result, when lithium ion batteries are used, it is possible to detect the charging level with high accuracy by simply measuring the open terminal voltage. When the voltage of a selected battery pack is to be measured, off-load measurement is possible only if the non-selected battery pack is sufficiently charged to allow the battery packs to be temporarily switched. If the non-selected battery pack does not allow such switching, on-load measurement must be performed on the selected battery pack. To roughly detect the charging level in this case, the average current consumed by main circuit 1009 while being in a predetermined operation mode is measured beforehand and a voltage drop calculated from the internal resistance and such current value as a correction value. During operation, when the voltage is actually to be measured, the computer (or other electronic apparatus) is brought into that predetermined operation mode and the voltage is measured. Since the current at that time will correspond to the average current previously measured the measured voltage can be corrected by the pre-calculated correction value. This is an easy way to detect which battery has the higher voltage level without requiring power supply to be switched, for voltage measurement, from one battery pack to another.

Now, specifically referring to FIG. 5 again, battery controller 107 compares the voltage of the selected battery pack (battery pack 101) with a predetermined reference voltage Vref11 (e.g. 6.8 V) in step S22, to judge whether the voltage is sufficient to sustain computer operation. If the voltage has dropped below Vref11, the voltage of the non-selected battery pack (battery pack 102) is checked in step S24. If the voltage of the non-selected battery pack is sufficient, in step S26, FETs 103 and 104 are turned off and FETs 105 and 106 are turned on to change selection of battery packs and supply power from battery pack 102. This operation of battery controller 107 is preferably reported to main circuit 109, which displays the new operating status on display 10, through displaying on display 10 that battery pack 102 is now selected or as otherwise necessary. Step S26 loops back to step S22, and the voltage of the selected battery pack 102 is measured and compared with another predetermined reference voltage Vref21.

If the voltage of the selected battery pack (now battery pack 102 in the assumed example) is not sufficient (step S22=NO) and the voltage of the non-selected battery pack (battery pack 101) is also determined insufficient (step S24), operation of the computer cannot be continued. Control thereafter passes to step S28. If the computer is operating in step S28, the user is notified that the battery voltage is low, and operation of the computer is stopped (step S30). If the computer is not operating in step S28, step S30 is skipped. Because neither battery pack has sufficient power to drive the computer, FETs 103 and 105 are turned on, and FETs 104 and 106 off, to bring the power supply system into the multiple connection mode (stop S32). The procedure then loops back to step S12 and the battery voltage is again checked.

The reference voltage Vref10 may be equal to or higher than Vref11 and the same is true for Vref20 and Vref21. Different reference levels may be applied for initially checking whether a battery pack is sufficiently loaded (steps S12, S14 in FIG. 5) on the one hand, and for checking (in step S24) whether a previously selected, now unselected battery pack may be selected again, i.e. has been recharged, on the other hand. Thus, while Vref10 and Vref20 are used in the first case, Vref13 (>Vref10) and Vref23 (>Vref20) may be used in the second case. When a battery pack is disconnected after having been discharged below Vref11 (Vref12) it may recover to some extent even without being charged. By suitable choosing Vref13 and Vref23 a frequent switching between poorly charged battery packs may be prevented. In addition, using Vref13/Vref23 the apparatus can detect whether a battery pack that had been discharged has been recharged or replaced by a freshly charged one. When battery pack 101 and battery pack 102 are of the same capacity and type, reference voltage Vref11 and reference voltage Vref21 may be the same; they may be different if the battery packs are of different capacities or types. The same applies to reference voltage pairs Vref10/Vref20 and Vref13/Vref23.

Based on the information supplied from battery controller 107, main circuit 9 at least briefly displays on display 10 that neither battery pack 101 nor battery pack 102 has a sufficient charge to sustain operation. This can be displayed, for example, by turning all elements in the bar graph indicators 42 and 43 shown in FIG. 2 off. It is also possible to display more conspicuously that there is no sufficient charge by, for example, flashing all or part of the indicators. It will be understood that this applies in the same way if only one indicator 42 utilized, or indicator 42 is utilized to indicate that a non-selected battery pack has no sufficient charge.

If the remaining charge (as represented by the voltage) is too low in both battery packs, the user must quickly stop the operation of the computer or the voltage supplied to the circuitry will continue to drop, possibly causing the computer to misoperate and possibly erasing data stored to RAM/RTC 17.

The preferred embodiment of the present invention therefore controls the batteries as described below to prevent this.

First, the user is notified using display 10 that the two battery packs are discharged to be below Vref11 or Vreff21, respectively. If the user then does not stop computer operation, i.e., not turn off the power switch, main circuit 109 executes a particular data save or other escape routine, and then places circuit operation in a suspend mode. When circuit operation stops, current consumption is significantly lower than during the operation of main circuit 109, so the remaining battery charge may be sufficient to hold the suspend mode of the main CPU 9a. While discharge is continued, the voltage decreases further. When the voltage reaches the detection threshold of voltage comparator 20 determined by zener diode 33 and resistors 31, 32, comparator 20a changes its output state from H to L causing FETs 103, 104, 105, 106 to be turned off and sub-CPU 107a to be in suspend mode. When this happens supply of power is switched from the battery packs to back-up battery 18 so as to back-up RAM/RTC 17 and to keep battery controller 107 in the suspend mode.

On the other hand, when the user notices that the remaining voltage is low in both battery packs and stops the system operation by turning off the power switch, main circuit 109 executes a predetermined escape routine in accordance with the designation of a resume function, and power (represented by Vd in FIG. 1) continues to be supplied to the circuit from the selected battery pack even after the computer is shut down. The detection threshold level used to determine whether the selected battery can provide back-up power may be a voltage level lower than the reference voltage level Vref11 or Vref21 used for normal operation. This is because while a relatively high voltage is needed to supply power to main circuit 109 via DC—DC converter 23 during normal operation, it is only necessary to supply a low voltage (approximately 3 V here) to maintain the resume state of main CPU 109a (via voltage regulator 24), to back-up RAM/RTC 17 and to keep the battery controller operative.

When both battery packs are discharged and the user wants to replace one battery pack with a fully charged battery pack, one of the discharged battery packs must be removed. Because the power supply system is in the multiple connection mode as described above, irrespective of which battery pack is removed first, the power supply to the circuit can be sustained during the circuit shutdown operation of the battery controller even if battery controller 107 does not control the FETs according to whether one of the battery packs has been removed.

When both battery packs can no longer sustain the normal computer operation they may still be sufficiently charged to back-up RAM/RTC 17, hold main CPU 9a in a suspend or resume mode and keep the battery controller operative. In this instance, by connecting the battery packs according to the multiple connection mode, it is possible to prevent unnecessary discharging of back-up battery 18. Because lithium batteries are commonly used for back-up batteries, back-up battery 18 must be replaced when discharged. It is therefore possible to greatly extend the back-up battery service life by minimizing use of back-up battery 18.

The case in which the voltage of each of two battery packs has dropped, the computer is stopped, and at least one of the battery packs is replaced has been described above. The problem in this case is that a battery pack is replaced after both battery packs have been discharged to an extent that the computer had to be stopped, causing the computer to interrupt any task underway and thus degrading work efficiency. Work efficiency can therefore be improved if the battery packs can be replaced while the computer continues operating because it is not necessary to interrupt the operation being performed. To enable a battery pack to be replaced while the computer continues operating, it must be possible to maintain operation using the one battery pack while the other battery pack is being removed and replaced. To that end, it is necessary in the embodiment described above to replace battery pack 101 before the voltage of battery pack 102 drops below the reference voltage Vref21 after the voltage of battery pack 101 dropped below Vref11 and battery pack 102 became selected.

For example, if the voltage of battery pack 101 drops to a certain level above Vref11 while the computer is operating on power sourced from battery pack 101, battery controller 107 may promptly disconnect battery pack 101 and select battery pack 102. Battery controller 107 would notify main circuit 109 of this change, and main CPU 9a would cause display 10 to display information informing the user that power is now being supplied from battery pack 102 because the voltage level of battery pack 101 has dropped. The user can then read this information and replace battery pack 101.

In such case, if the user wants to replace a non-selected discharged battery pack while the voltage level of the selected battery pack is sufficient to maintain operation (this being the most common situation), this may be done while the computer continues operating. It is therefore possible to sustain uninterrupted operation of the computer by repeating this process as necessary to replace the discharged (low voltage) battery pack.

However, if the user mistakenly replaces the selected battery pack, the power supply will instantaneously break down when the selected battery pack is removed, and the circuit may easily misoperate. In accordance with an embodiment of the invention, however, the user can easily determine which battery pack must be replaced because display 10 displays which battery pack is selected, which battery pack is non-selected and whether the non-selected battery pack needs to be replaced. Furthermore, if the battery cover for the selected battery pack is mistakenly opened, battery controller 107 can determine that the wrong battery pack is about to be removed by means of cover detection switch 14 for battery pack 101 or cover detection switch 15 for battery pack 102, and can therefore activate a buzzer 11 as a warning. By hearing buzzer 11, the user in turn knows that the battery cover for the selected battery pack was opened. The user can also see LED 12 for battery pack 101 and LED 13 for battery pack 102 when he opens battery cover 45 or 46, respectively.

For example, if the user erroneously opens the battery cover 46 to replace battery pack 102 when battery pack 102 is selected, battery controller 107 detects that the battery cover for battery pack 102 has been opened by means of a signal from the cover detection switch 15, and activates buzzer 11. It simultaneously turns on LED 13 for battery pack 102 to notify the user that battery pack 102 is in use. The user is thus notified by both the buzzer sound and the LED that the wrong battery pack is about to be replaced, and can stop the replacement operation before removing the wrong battery pack. If these LEDs were always on while the corresponding battery packs are selected, 10-20 mA of current would be wasted to light the LEDs. Battery controller 107 therefore controls the LEDs to light only for a predetermined period when the battery cover for a selected battery pack is opened.

Despite the double warning described above, the user may still erroneously remove the wrong battery pack. Misoperation of the computer can be prevented even in this case by the method described below.

It is assumed in this example that battery pack 102 is selected, the user erroneously opens the battery cover 46 for battery pack 102, and battery controller 107 detects that battery pack 102 is about to be replaced. Battery controller 107 therefore detects the voltage of battery pack 101, and if the voltage is found sufficient to drive the computer, i.e., is greater than reference voltage Vref11, it turns FETs 103 and 104 on and FETs 105 and 106 off to select battery pack 101 while disconnecting battery pack 102. The computer thus continues operating using the power supplied from the selected battery pack 101. In this case, if battery pack 101 is either not installed or does not have sufficient voltage left to power the computer, battery controller 107 can execute a predetermined data escape routine and stop circuit operation. The circuit will therefore not misoperate even when battery pack 102 is mistakenly removed because circuit operation has already been stopped.

Figure 6:
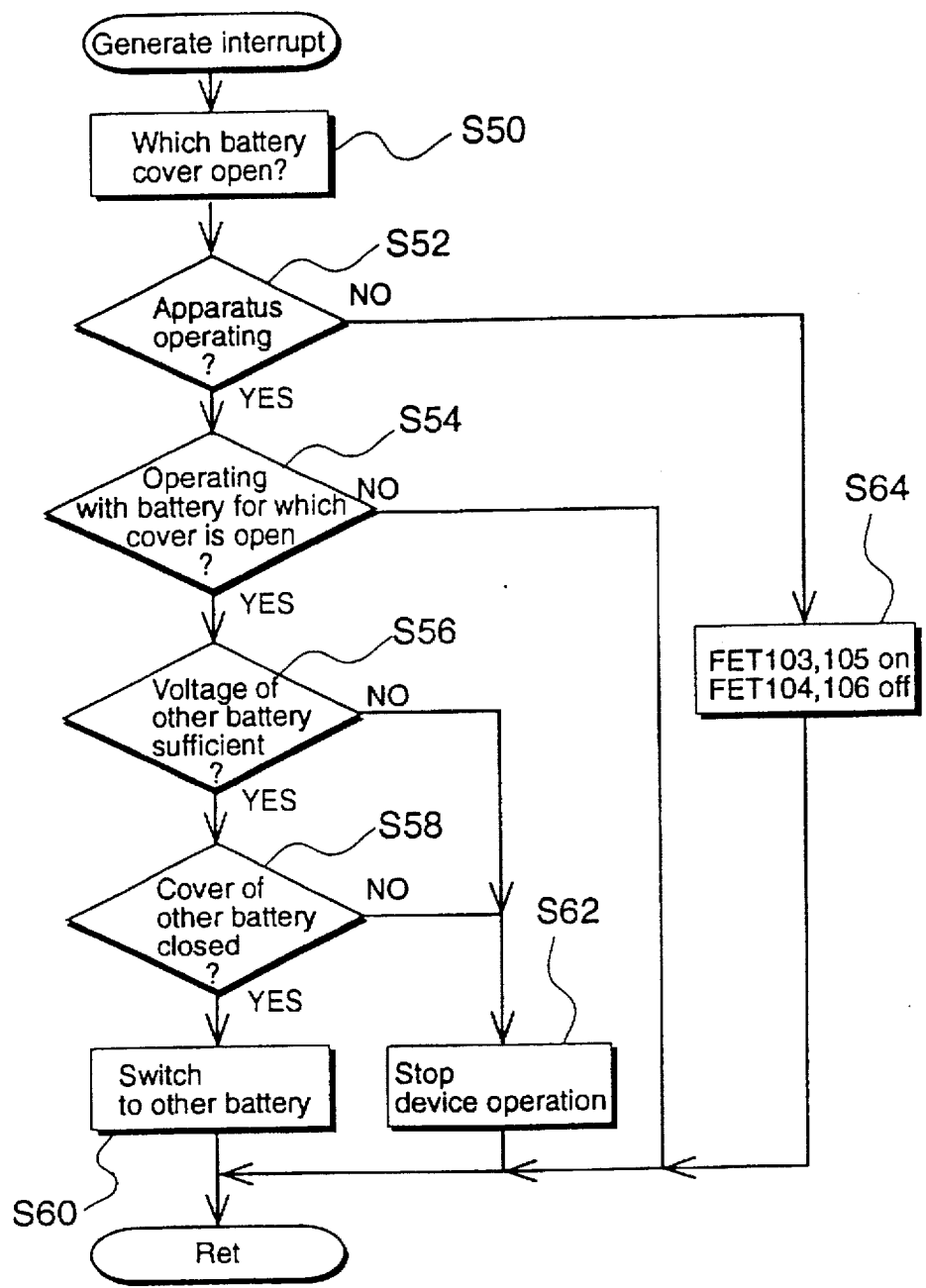
FIG. 6 is a flow chart used to describe the power supply control process executed when one of the battery covers is opened according to the preferred embodiment of the invention.

FIG. 6 is a flow chart of the above-described process executed by battery controller 107 when battery cover 45 or 46 is opened, and will be explained in greater detail hereinbelow. When a battery cover is opened, the corresponding detector switch 14 or 15 operates and generates an interrupt signal to begin the interrupt process within battery controller 107. When this interrupt signal is generated, it is first determined which battery cover was opened (step S50). It is then determined whether the computer is operating (step S52). If it is not operating, the power supply system is switched to the multiple connection mode (step S64) so that the battery pack can be removed at any time, and control returns from the interrupt process. If the computer is operating, it is determined whether the battery pack for which the battery cover is open is the selected one (step S54). If it is not selected, control returns from the interrupt process because removing a non-selected battery pack will not affect the computer operation.

If, however, the battery pack for which the battery cover is open is selected, it is instead determined whether there is sufficient voltage left in the other (non-selected) battery pack (step S56). If the voltage of the other battery pack is not sufficient, operation of the computer cannot be sustained if the (selected) battery pack for which the battery cover is open is removed, and operation is therefore stopped (step S62). On the other hand, if the voltage of the other battery pack is sufficient but its corresponding battery cover is also determined to be open in step S58, device operation cannot be assured even if the power supply is switched to the other battery pack. Operation is therefore stepped in step S62, and control returns from the interrupt process. If the voltage of the other battery pack is sufficient and the battery cover therefor is closed, the power supply can be switched. The power supply is therefore switched to the other battery pack in step S60, and control returns from the interrupt process. When a battery cover is opened and the battery pack is replaced with a charged battery pack, the battery voltage is checked in steps S12 and S14 in FIG. 5, and the appropriate battery pack is again selected for the power supply.

In the situation explained above, rather than switching to battery pack 101 when the computer is operating, the battery controller could alternatively set the power supply system into the multiple connection mode. However, since the computer is operating, the load current may be relatively high causing the voltage drop by the forward voltage of the parasitic diodes 104a, 106a to increase, so that the voltage actually applied to the DC—DC converter 30 drops by 0.7–1 V below the actual battery voltage. As a result, there are cases in which it is not possible to supply sufficient voltage to maintain circuit operation. This problem may be avoided by connecting a Schottky barrier diode in parallel to each of FETs 104 and 106. The forward voltage of a Schottky barrier diode is low, approximately 0.2–0.4 V, and it can supply a higher voltage to the circuit in comparison with a parasitic diode.

Thus, when a Schottky barrier diode is used, the multiple-power supply mode can be executed to supply power from both battery packs when the user erroneously opens the battery cover to replace the battery pack currently in use. If the battery pack is actually removed despite the warnings, the Schottky barrier diodes will automatically connect the remaining battery pack to the DC—DC converter 30.

When two battery packs are used, the power supply can be switched between the two battery packs in two ways: completely discharging one battery pack before switching to the other, or switching to the second battery pack while a certain (known) charge remains in the first battery pack. The operating time per battery pack can be increased with the former method because each battery is completely discharged before switching. On the other hand, operation of the computer may be suddenly interrupted during battery replacement if the currently selected battery pack is inadvertently replaced and there is no sufficient charge left in the other battery pack. While the operating time per battery pack is shortened when the battery is switched while some charge remains in the currently selected battery pack, this enables computer operation to be sustained if the wrong battery is replaced.

Which of these control methods is preferable will depend on the actual operating conditions. For example, for electronic apparatus used continuously from morning to night where the battery packs are periodically replaced, it is obviously better to switch from a first to a second battery pack while some charge remains in the first battery pack. More specifically, if the battery pack must be frequently replaced, there are more opportunities to mistakenly replace the wrong battery pack, and there are therefore more opportunities to interrupt operation of the electronic apparatus. It is therefore preferable in such situations to reduce the likelihood for such interruptions. When the device is used intermittently and one or two battery packs is sufficient to provide power for a full day, however, it may be preferable for the user to completely discharge one battery pack before switching to the other.

As explained above, in the present invention, the battery controller 107 switches the battery packs based on a measured value representing the remaining charge of the battery packs. The foregoing explanation assumed the use of lithium ion batteries allowing the battery pack voltage measured by A/D converter 108 to be used for this purpose. The measured value is compared with a reference value and when the former has decreased below the latter, battery controller 107 switches the battery packs, i.e., disconnects the currently selected battery pack and connects (selects) another one. By appropriately setting the reference value(s), it is thus possible to select the battery pack selection method best suited to the operating conditions of the electronic apparatus requiring such power management. In the preferred embodiment of the invention, the reference value(s) at which the battery packs are switched should be adjustable by the user.

This may be achieved by allowing the user to set the reference value at which the battery packs are switched using a keyboard or other input means (not shown in the figures) connected to I/O section 16, and having main circuit 109 supply this (these) reference value(s) to battery controller 107. The user may either be allowed to directly enter the reference value(s) from the apparatus input device (such as a keyboard or voice interface), or to select among two or more predetermined operating modes, such as operating time priority or battery replacement safety priority.

Incidentally, when AC adapter 21 is connected, a detection signal is output from an adapter detection circuit 22 resulting in an OFF signal being supplied through gate circuits 26 and 27 to the control terminals of FETs 104 and 106, by which the power supply from the batteries is interrupted. This detection signal is also supplied to the battery controller 107. Although replacement of discharged battery packs has been explained above, when AC adapter 21 is connected to the battery packs may be re-charged while remaining in the computer. As shown in FIG. 1, each battery pack is connected to input terminal 21a via a respective series connection of a resistor, a diode and a transistor 28 (29). The detection signal informs the battery controller 107 that AC adapter 21 is connected. When this is the case and the battery voltage is to be measured, the transistor 28 or 29 corresponding to the battery pack whose voltage is to be measured is temporarily turned off to stop charging so that accurate open voltage measurement may be performed without being influenced by the charging process.

Figure 8:
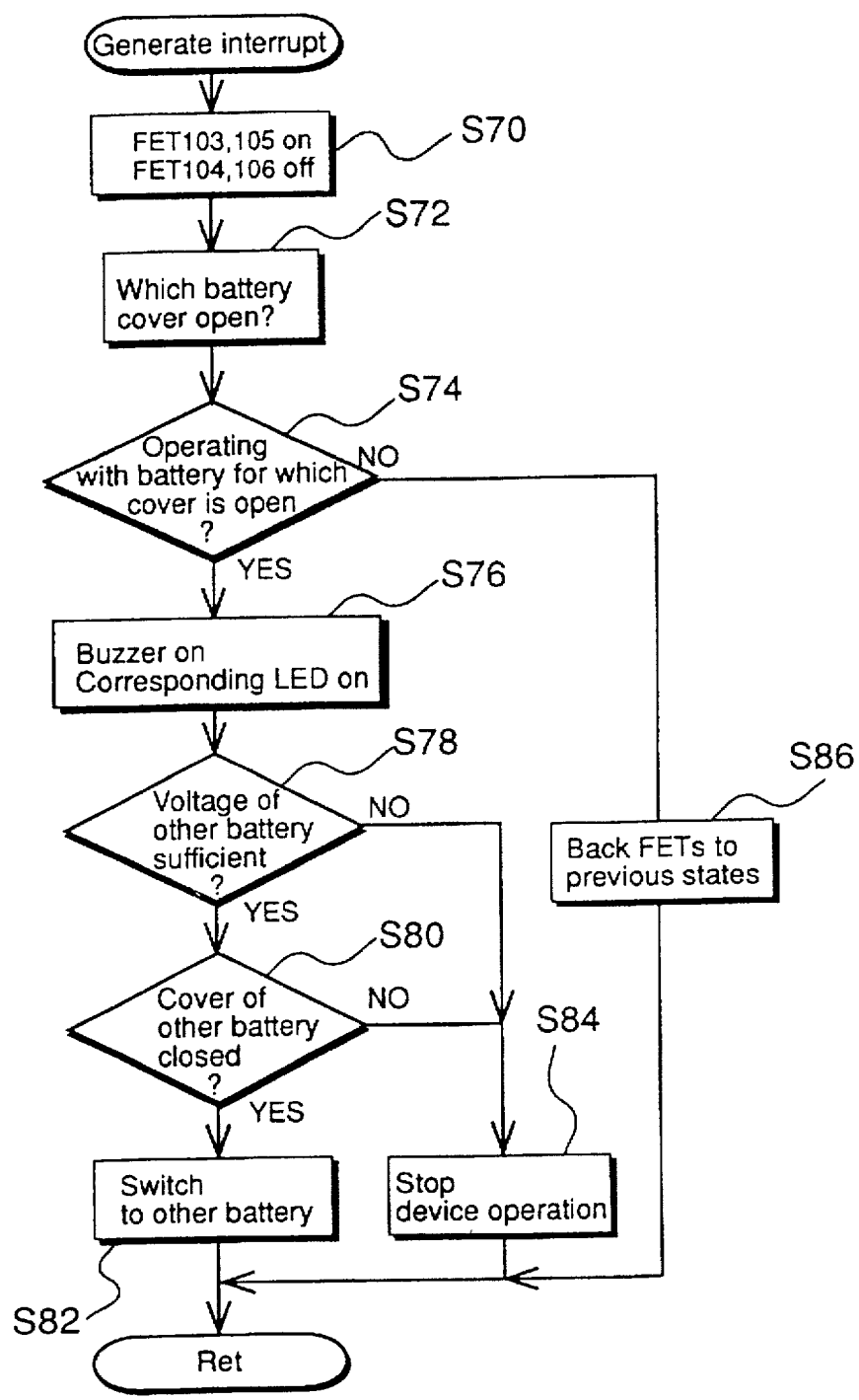
FIG. 8 is a flow chart used to describe the power supply control process executed when one of the battery covers is opened according to an alternative embodiment of the present invention.

FIG. 8 is a flow chart describing an alternative process executed by battery controller 107 when battery cover 45 or 46 is opened. When one of the battery covers is opened, corresponding detector switch 14, 15 operates and generates an interrupt signal to begin the interrupt process within the battery controller 107. When this interrupt signal is generated, the main batteries are placed in a multiple connection mode (step S70). Next, a determination is made as to which battery cover was opened (step S72).

If, in step S72 it is determined that the battery pack for which the battery cover is open is currently selected as the primary power source for the computer, control passes to step S76 in which buzzer 11 and the alarm indicator (LED) are activated. Control thereafter passes to step S78, where the non-selected battery's charge-level is evaluated, preferably against a user-selectable threshold value. If the non-selected battery is determined to have a sufficient charge level in step S78, control passes to step S80, where the cover status of the alternate, non-selected battery is determined, preferably by having the battery controller 107a examine or poll the status of the non-selected battery's cover-open sensor. If the non-selected battery's cover is closed, or the battery is satisfactorily secured to the computer if an alternative securing method is employed, control passes to step S82, in which the battery controller selects the non-selected battery as the primary power source for the computer and instructs the switching network to initiate a single connection mode directed to the newly-selected battery. Control thereafter terminates naturally within this interrupt service routine.

If, however, if either the determination is made that the non-selected battery exhibits an insufficient charge level in step S78 or the non-selected battery cover is opened or otherwise unsecured as determined in step S80, control within battery controller 107 instead passes to step S84, where operation of the computer is halted in an orderly fashion. Control thereafter terminates naturally within this interrupt service routine.

Also, if in step S74, the determination is made that the non-selected battery's cover is open or has become unsecured (while the selected battery's cover remains closed and secure), control instead passes to Step S86, in which the previous single connection mode and selected battery is reset by toggling the appropriate FETs 103–106 according to the selected power source as described hereinabove. Control thereafter terminates naturally within this interrupt service routine.

It should be noted that while the present invention has been described above with reference to two battery packs, it is also possible to use three or more battery packs with a similar configuration. Furthermore, lithium ion batteries are described as the battery packs above, but the invention shall not be so limited. As will be understood by those ordinarily skilled in the art with knowledge of the instant disclosure, Ni—Cd, nickel hydrate, and lead acid batteries can also be used. However, accurate measurement of remaining battery charge by means of voltage measurement is only possible using lithium batteries and lead acid storage batteries. As will be appreciated by those skilled in the art, where other types of battery are used, instead of the voltage measurements explained above appropriate other measurements will have to be performed allowing to obtain a value representing the actual charging level of the batteries.

While the invention has been described herein in conjunction with specific, preferred and alternative embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A power supply for an electronic device, comprising:
   first and second main power sources;
   a charge detector in communication with said first and second main power sources to individually detect the charge levels of each said first and second main power sources;
   a switching circuit in communication with said first and second main power sources for selectively routing respective power signals generated by said first and second main power sources to the electronic device; and
   a power controller in communication with said charge detector and said switching circuit for controlling the switching circuit between a single connection mode and a default multiple connection mode according to the charge levels detected by said charge detector, said power controller setting said switching circuit in the multiple connection mode upon electronic device startup;
   wherein said power controller sets said switching circuit into the multiple connection mode when the respective charge levels of both said main power sources fail to exceed a predetermined threshold as detected by said charge detector;
   wherein, in the single connection mode, said switching circuit electrically connects a selected one of said first and second main power sources to a power input of the electronic device while disconnecting the remaining main power source; and
   wherein, in the multiple connection mode, said switching circuit electrically connects both said first and second main power sources in series with respective first and second diode means and in parallel with a power input of the electronic device.

2. The power supply of claim 1, further comprising a back-up battery in communication with said power controller for delivering power thereto when the respective charge levels of both said main power sources fail to exceed a predetermined threshold as detected by said charge detector.

3. The power supply of claim 1, wherein said switching circuit comprises:
   first and second switching elements connected in series and electrically interposing said first main power source and the power input of the electronic device; and
   third and fourth switching elements electrically connected in series interposing said second main power source and the power input of the electronic device, wherein each said switching element includes a diode and an electronic switch connected in parallel, said electronic switch of each said switching element including a control terminal in communication with said power controller.

4. The power supply of claim 3, wherein each said switching element diode comprises a Schottky barrier diode.

5. The power supply of claim 3, wherein
   each said electronic switch comprises a field effect transistor including a parasitic diode connected in parallel to a source-drain path of said field effect transistor; and
   wherein said respective field effect transistors of said first and second electronic switches are coupled in series such that anodes of their respective parasitic diodes are electrically connected.

6. The power supply of claim 5, wherein said respective field effect transistors of said third and fourth electronic switches are coupled in series such that anodes of their respective parasitic diodes are electrically connected.

7. The power supply of claim 5, wherein said respective field effect transistors of said third and fourth electronic switches are coupled in series such that cathodes of their respective parasitic diodes are electrically connected.

8. The power supply of claim 3, wherein
   each said electronic switch comprises a field effect transistor including a parasitic diode connected in parallel to a source-drain path of said field effect transistor; and
   wherein said respective field effect transistors of said first and second electronic switches are coupled in series such that cathodes of their respective parasitic diodes are electrically connected.

9. The power supply of claim 8, wherein said respective field effect transistors of said third and fourth electronic switches are coupled in series such that anodes of their respective parasitic diodes are electrically connected.

10. The power supply of claim 8, wherein said respective field effect transistors of said third and fourth electronic switches are coupled in series such that cathodes of their respective parasitic diodes are electrically connected.

11. The power supply of claim 3, wherein
   said first and second main power sources each comprise a battery having power output terminals, each said battery exhibiting a charge level directly proportional to a terminal voltage measured across said respective power output terminals; and
   wherein said charge detector comprises a voltage detection means coupled to said power output terminals of said first and second batteries for measuring the terminal voltage of said first and second batteries.

12. An electronic device, comprising:
   a main circuit;

a power input port in communication with said main circuit; and a power supply for supplying power to said main circuit, comprising:

first and second main power sources;

a charge detector in communication with said first and second main power sources to individually detect the charge levels of each said first and second main power sources;

a switching circuit in communication with said first and second main power sources for selectively routing respective power signals generated by said first and second main power sources to said power input port; and a power controller in communication with said charge detector and said switching circuit for controlling the switching circuit between a single connection mode and a multiple connection mode according to the charge levels detected by said charge detector, said power controller setting said switching circuit in the multiple connection mode upon device startup.

13. The electronic device of claim 12, wherein said power controller sets said switching circuit into the multiple connection mode when the respective charge levels of both said main power sources fail to exceed a predetermined threshold as detected by said charge detector.

14. The electronic device of claim 12, wherein, in the multiple connection mode, said switching circuit electrically connects both said first and second main power sources in series with respective first and second diode means and in parallel with said power input port; and wherein, in the single connection mode, said switching circuit electrically connects a selected one of said first and second main power sources to said power input port while disconnecting the remaining main power source.

15. A method of controlling a power supply for an electronic device including an external housing, plural power sources detachably mounted within the external housing and accessible via a corresponding plurality of removable covers defined on said housing, the method comprising the steps of:

(a) detecting whether at least one of the covers is open;

(b) switching the power sources into a multiple connection mode if at least one of the covers is open as detected in said detecting step (a);

(c) determining whether any of the power sources other than power sources corresponding to the at least one opened cover has a charge level exceeding a first predetermined reference value;

(d) selecting one of the power sources, if any, whose charge level exceeds the first predetermined reference value as determined in said determining step (c); and (e) switching the power sources in a single connection mode utilizing the selected power source selected in said selecting step (d) to power the electronic device.

16. A method of controlling a power supply for an electronic device having plural power sources, comprising the steps of:

(a) switching the power sources into a multiple connection mode;

(b) detecting if the charge level of at least one of said power sources exceeds a first predetermined reference value;

(c) selecting one of said power sources, if any, whose charge level exceeds the first predetermined reference value as detected in said detecting step (b);

(d) switching the power sources into a single connection mode utilizing the selected power source selected in said selecting step (c) to power the electronic device;

(e) detecting if the selected power source charge level falls below a second predetermined reference value;

(f) performing the following when the selected power source charge level falls below a second predetermined reference value as detected in said detecting step (e):

(1) detecting if the charge level of at least one of said power sources exceeds a third predetermined reference value;

(2) selecting one of said power sources, if any, whose charge level exceeds the third predetermined reference value as detected in said detecting step (f)(1); and (3) switching the power sources into a single connection mode utilizing the selected power source selected in said selecting step (f)(2) to power the electronic device; and (g) re-switching the power sources back into a multiple connection mode when the power source selected in one of said selecting steps (c) and (f)(2) falls below the second predetermined reference value.

17. The method of claim 16, further comprising the steps of:

(h) detecting whether the selected power source is about to be removed; and (i) performing the following if the power source is about to be removed as detected in said detecting step (h):

(1) measuring the charge level of at least one of the non-selected main power sources;

(2) switching the power sources into a single connection mode utilizing a non-selected power source, if any, whose charge level measured in said measuring step (i)(1) exceeds the first predetermined reference value; and (3) if there is no non-selected power source whose charging level is higher than the first predetermined reference value as measured in said measuring step (i)(1), switching the power sources according to the multiple connection mode.

* * * * *

UNITED STATES PATENT AND TRADEMARK OFFICE
CERTIFICATE OF CORRRECTION

PATENT NO. : 5,739,596
DATED : April 14, 1998
INVENTOR(S) : Yasutoshi Takizawa, et. al.

It is certified that error appears in the above-identified patent and that said Letters Patent is hereby corrected as shown below:

Title page, under item [56], References Cited, insert the followings under Foreign Documents.

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | WO | 95 | /3 | 0 | 9 | 4 | 9 | 11/16/95 | WIPO | | | |
| | | 0 | 6 | 6 | 5 | 6 | 2 | 7 | 8/2/95 | EPO | | | |
| | | 0 | 6 | 9 | 5 | 0 | 1 | 7 | 1/31/96 | EPO | | | |
| | | 0 | 4 | 3 | 4 | 9 | 0 | 5 | 7/3/91 | EPO | | | |
| | | 0 | 4 | 6 | 3 | 5 | 9 | 3 | 1/2/92 | EPO | | | |
| | | | | | | | | | | | | | |

Signed and Sealed this

Ninth Day of March, 1999

Attest:

Q. TODD DICKINSON

Attesting Officer

Acting Commissioner of Patents and Trademarks